(12) United States Patent
Bradfield

(10) Patent No.: US 12,343,580 B2
(45) Date of Patent: Jul. 1, 2025

(54) SYSTEMS, METHODS, AND APPARATUSES FOR MECHANICALLY SECURING A CHECK VALVE IN AN OPEN POSITION DURING MAINTENANCE AND TESTING OPERATIONS

(71) Applicant: Jeremy Ryan Bradfield, Sandy, OR (US)

(72) Inventor: Jeremy Ryan Bradfield, Sandy, OR (US)

( * ) Notice: Subject to any disclaimer, the term of this patent is extended or adjusted under 35 U.S.C. 154(b) by 627 days.

(21) Appl. No.: 17/830,149

(22) Filed: Jun. 1, 2022

(65) Prior Publication Data

US 2022/0379151 A1  Dec. 1, 2022

Related U.S. Application Data

(60) Provisional application No. 63/195,535, filed on Jun. 1, 2021.

(51) Int. Cl.
*F16K 15/18* (2006.01)
*A62C 37/50* (2006.01)
*F16K 5/04* (2006.01)

(52) U.S. Cl.
CPC .......... *A62C 37/50* (2013.01); *F16K 15/1821* (2021.08); *F16K 5/0442* (2013.01); *Y10T 137/7898* (2015.04)

(58) Field of Classification Search
CPC ... A62C 37/50; F16K 5/0442; F16K 15/1821; Y10T 137/7898

USPC .................... 251/82, 339; 137/527
See application file for complete search history.

(56) References Cited

U.S. PATENT DOCUMENTS

| | | | | |
|---|---|---|---|---|
| 1,699,706 | A * | 1/1929 | Loepsinger | A62C 35/645 169/22 |
| 6,149,125 | A * | 11/2000 | Nilsson | F16K 15/1843 251/63.4 |
| 6,557,645 | B1 * | 5/2003 | Ringer | F16K 15/1821 169/17 |
| 8,672,289 | B2 * | 3/2014 | Fenwick | F16K 1/14 251/339 |
| 9,795,815 | B2 * | 10/2017 | Ringer | F16K 37/0041 |

* cited by examiner

*Primary Examiner* — John Bastianelli
(74) *Attorney, Agent, or Firm* — Elliott, Ostrander & Preston, P.C.

(57) ABSTRACT

A system including a set rod with a first and second end, and a curved portion, in which the first end is to be placed against a clapper inside a check valve, and a first connecting nipple having a first end to thread into a ball drip outlet of the check valve and a second end to receive a rod locking component. The rod locking component has a first end to attach with the second end of the first connecting nipple, a second end, and a lock mechanism positioned in a center portion to positionally fix the set rod in its position while placed against the clapper inside of the check valve. The set rod traverses through the ball drip outlet into the first connecting nipple, through the first connecting nipple into the rod locking component, and egresses through the second end of the rod locking component.

20 Claims, 12 Drawing Sheets

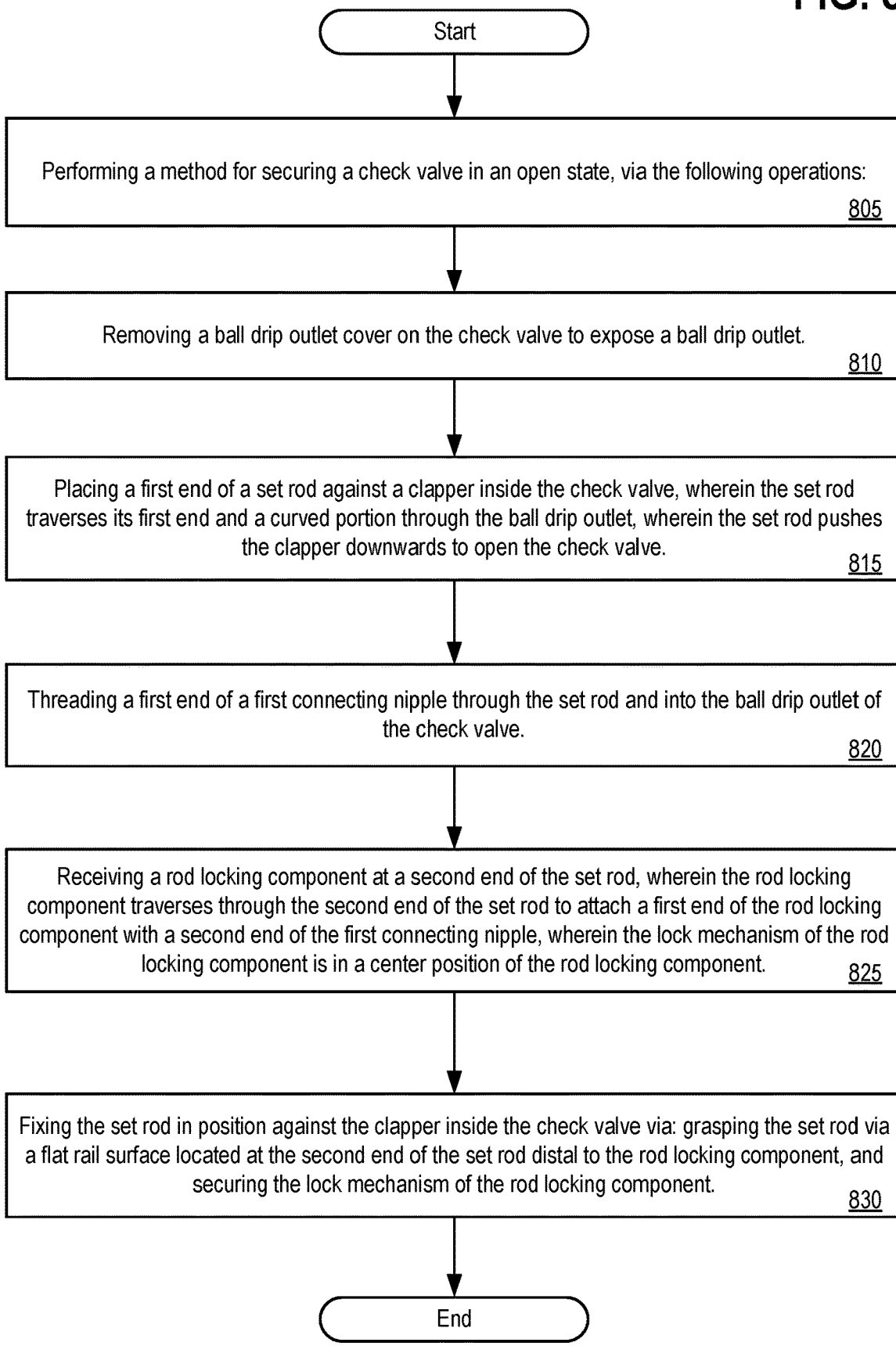

SYSTEMS, METHODS, AND APPARATUSES FOR MECHANICALLY SECURING A CHECK VALVE IN AN OPEN POSITION DURING MAINTENANCE AND TESTING OPERATIONS

CLAIM OF PRIORITY

This U.S. Utility Patent Application is related to, and claims priority to, U.S. Provisional Patent Application No. 63/195,535, entitled "SYSTEMS, METHODS, AND APPARATUSES FOR MECHANICALLY SECURING A CHECK VALVE IN AN OPEN POSITION DURING MAINTENANCE AND TESTING OPERATIONS," filed on Jun. 1, 2021, the entire contents of which are incorporated herein by reference as though set forth in full.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the technical field related to fire safety and fire suppression systems. More particularly, disclosed embodiments relate to systems, methods, and apparatuses for mechanically securing a check valve in an open position during maintenance and testing operations.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

Damage and destruction to property and loss of life from fires costs billions of dollars every year and destroys the lives of families and individuals through death, disability, displacement, and severe economic hardship. Fires may be attributable to human activity in situations involving accidents and or even neglect in connection with improper electrical wiring, neglected maintenance, misuse of residential living spaces, installation of improper building materials, smoking of tobacco products in bedrooms, cooking fires, pyrotechnics, etc.

Common, everyday tasks that typically go unnoticed can ultimately be the cause of a house fire. To help eliminate the risk of uncontrolled fire in residences and other occupied structures, it is necessary to invest in the proper fire safety equipment that will not just alert occupants to the presence of a fire but also actively initiate fire suppression operations, such as the disbursement of water via an indoor sprinkler system or via the disbursement of other fire suppressing agents, such as gas or chemicals in a non-residential setting.

It is estimated that approximately eighty percent of fire deaths occur in residences, with over 3,000 people dying per year in U.S. house fires. So called indoor sprinkler systems, more formally called "residential fire-protection systems" and "residential fire-suppression systems" are generally mandated by code in most multi-unit residential dwellings due to their proven track-record for saving lives. Similar indoor sprinkler systems are used in commercial buildings ("commercial fire-protection systems" and "commercial fire-suppression systems").

However, such systems require maintenance in order to operate properly when an emergency occurs. For instance, not only is testing necessary to verify that the system is operating as expected (e.g., water pressure is at expected levels) but additionally, it is necessary to perform periodic maintenance on such systems to ensure that water flow rates meet specified operating parameters when the system is needed. This is because over time, various contaminants and obstructions may find their way into these residential fire-suppression systems, which then cause mechanical blockages at the sprinkler heads when the system is engaged. Additional maintenance requires not only flushing fire-suppression systems to clear debris from the sprinkler piping, but may further require pressure testing the fire-suppression systems to verify that its various system components can withstand the potential pressures it will be subjected to when called into service.

Common maintenance procedures which are required include Fire Department Connection (FDC) backflushes, forward-flow tests and FDC hydrostatic tests, each of which serve to clear contaminants and blockages before such contaminants have an opportunity to impede water flow at the sprinkler head termination points. An FDC backflush involves forcing water in a reverse direction out of the system (e.g., away from the sprinkler heads). The forward flow aids in verifying whether or not the water supply is sufficient to meet the flow demands of the fire-suppression system when engaged. And the hydrostatic test verifies that the system's piping, joints, and other connections can withstand the stresses placed upon it when placed into operation, regardless of whether activated by automatic means, manually, or utilized by professional firefighters responding to a fire incident.

Complicating matters, however, is the issue of by-passing a reverse flow check valve installed into various types of fire-suppression systems. The reverse flow check valve is installed specifically to prevent the flow of water in a reverse direction. Manual removal and flipping of the reverse flow check valve is a typical and generally accepted method of conducting FDC backflushes, forward flows and FDC hydrostatic tests.

Unfortunately, prior known procedures for by-passing a reverse flow check valve are onerous, complicated, labor-intensive and therefore costly to perform. As reverse flow check valves are often in spatially-confined and difficult to access spaces, for example, adjacent to a Fire Department Connection (FDC), labor-intensive procedures such as cutting into and removing sections of surrounding pipes or the reverse flow check valve itself have often been necessary.

The present state of the art may therefore benefit from the systems, methods, and apparatuses for mechanically securing a check valve in an open position during maintenance and testing operations, as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 depicts a flowchart a flowchart for an exemplary method for securing a check valve in an open state, in accordance with described embodiments.

DETAILED DESCRIPTION

Described herein are systems, methods, and apparatuses for mechanically securing a check valve in an open position during maintenance and testing operations. For example, there is a system including: a set rod having a first end and a second end, and a curved portion, in which the first end of the set rod is to be placed against a clapper inside the check valve; a first connecting nipple having a first end to thread into a ball drip outlet of the check valve and a second end to receive a rod locking component; the rod locking component having at least: (i) a first end to attach with the second end of the first connecting nipple, (ii) a second end, and (iii) a lock mechanism positioned in a center portion of the rod locking component to positionally fix the set rod in its position while placed against the clapper inside of the check valve; in which the first end of the set rod is to be positioned against the clapper inside the check valve, in which the set rod is fixed in its position by the lock mechanism of the rod locking component, and in which the set rod traverses through the ball drip outlet of the check valve into the first connecting nipple, through the first connecting nipple into the rod locking component, and egresses through the second end of the rod locking component.

In the following description, numerous specific details are set forth such as examples of specific configurations, use cases, materials, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by specially manufactured components or may utilize general-purpose components in certain instances to realize and perform the innovative function and configuration of the described embodiments. Alternatively, the operations may be performed by a combination of customized specially manufactured components with certain general purpose components to make, use, and practice the inventive aspects as set forth herein.

Figure 1:
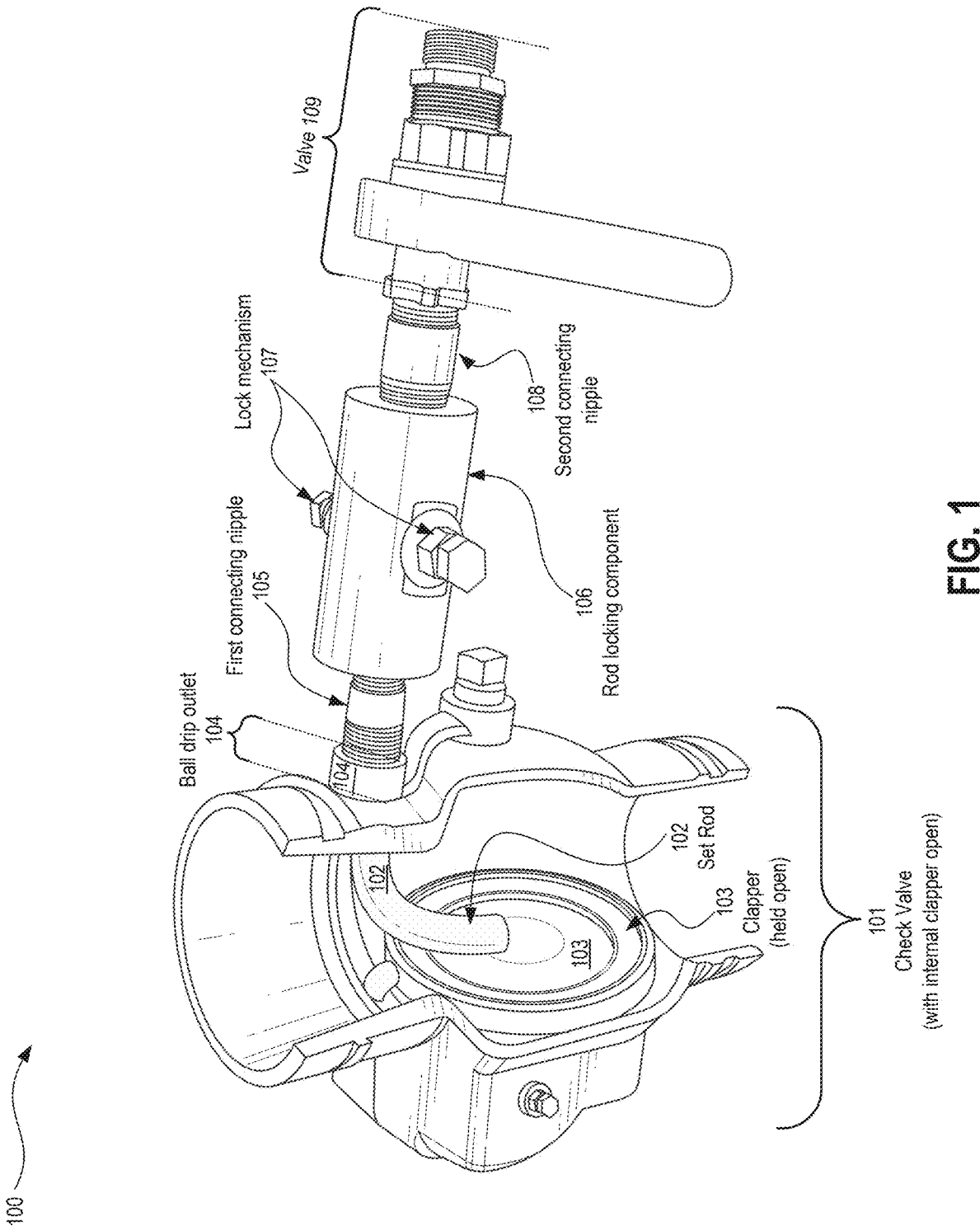
FIG. 1 depicts an exemplary system for mechanically securing a check valve in an open position during maintenance and safety operations, in accordance with described embodiments.

FIG. 1 depicts an exemplary system for mechanically securing a check valve in an open position during maintenance and safety operations, in accordance with described embodiments.

As shown here, there is a system 100 including: a set rod 102 having a first end and a second end, and a curved portion, in which the first end of the set rod 102 is to be placed against a clapper 103 inside the check valve 101; a first connecting nipple 105 having a first end to thread into a ball drip outlet 104 of the check valve 101 and a second end to receive a rod locking component 106; the rod locking component 106 having at least: (i) a first end to attach with the second end of the first connecting nipple 105, (ii) a second end, and (iii) a lock mechanism 107 positioned in a center portion of the rod locking component 106 to positionally fix the set rod 102 in its position while placed against the clapper 103 inside of the check valve 101; in which the first end of the set rod 102 is to be positioned against the clapper 103 inside the check valve 101, in which the set rod 102 is fixed in its position by the lock mechanism 107 of the rod locking component 106, and in which the set rod 102 traverses through the ball drip outlet 104 of the check valve 101 into the first connecting nipple 105, through the first connecting nipple 105 into the rod locking component 106, and egresses through the second end of the rod locking component 106.

According to certain embodiments, the placement of set rod 102 in system 100 may involve measuring a distance to insert set rod 102 into check valve 101 by holding set rod 102 in front of check valve 101 with the first end of set rod 102 pointed in a downward position corresponding to a target point of a first end of the first end of set rod 102 inside check valve 101 that is below clapper 103. Next, a line on set rod 102 may be demarcated that corresponds to an intersection point between set rod 102 and a perpendicular plane traversing set rod 102 and ball drip outlet 104. Finally, set rod 102 may be inserted through ball drip outlet 104 until the demarcated line on set rod 102 interfaces with ball drip outlet 104, with the first end of set rod 102 pointed downwards.

According to certain embodiments, the system may be known as the Hydra-Tap.

According to certain embodiments, rod locking component 106 may be cylindrically shaped and have a threaded first end to thread onto and seal against first connecting nipple 105.

According to certain embodiments, various components of system 100 such as set rod 102, first connecting nipple 105, rod locking component 106, and lock mechanism 107 of rod locking component 106 may be variable in size, diameter, shape, and length to accommodate variations in the size, diameter, shape, and length of each other or other components of the system 100 such as check valve 101 or clapper 103 and ball drip outlet 104 of check valve 101.

According to certain embodiments, various accessories placed over set rod 102 to secure and lock set rod 102, such as first connecting nipple 105, rod locking component 106 and lock mechanism 107 may be molded as one or more continuous pieces to fit over and secure set rod 102. According to certain embodiments, attachable adapters may be used to adapt the diameter, size, and shape of such a continuous piece or continuous pieces by serving as an intermediary in order to thread the continuous piece(s) into ball drip outlet 104 or otherwise connect the continuous piece(s) to ball drip outlet 104, or to connect two or more continuous pieces together, or to otherwise secure the continuous piece(s) around set rod 102.

As shown here, the check valve 101 has been removed from connections to pipe or other plumbing structure, and a front portion of check valve 101 has been removed to provide a view inside the check valve 101 shown clapper 103 and the first end of set rod 102 when set rod 102 is placed inside check valve 101.

According to other embodiments, an optional second connecting nipple 108 is added to system 100 to secure the set rod 102 further. Second connecting nipple 108 may be added, for example, distal to rod locking component 106, and secured over the second end of set rod 102 that egresses through the second end of the rod locking component 106.

According to yet other embodiments an optional valve 109 may be added to system 100 to prevent leakage of fluid at the second end of set rod 102. Valve 109 may have several connecting components and a handle. Valve 109 may be placed over the second end of set rod 102, distal to, for example, rod locking component 106 or second connecting nipple 108.

Figure 2:
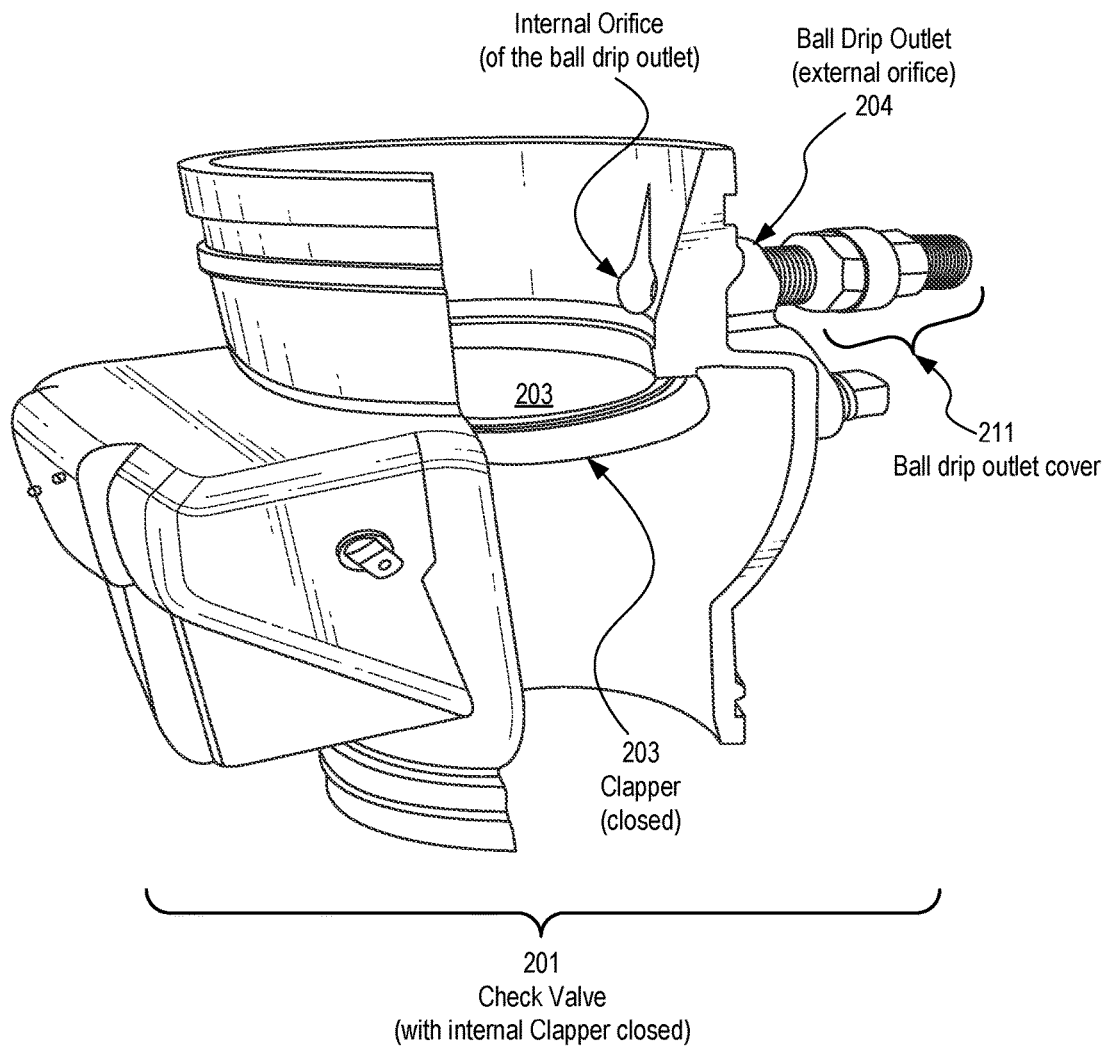
FIG. 2 depicts an exemplary check valve in a closed position with ball drip outlet cover, in accordance with described embodiments.

FIG. 2 depicts an exemplary check valve in a closed position with ball drip outlet cover 200, in accordance with described embodiments.

As shown here, a front portion of check valve 201 has been removed to provide a view inside check valve 201 showing clapper 203 at its horizontal resting position, with clapper 203 closing check valve 201 by sectioning the interior of check valve 201 across a horizontal plane to prevent the flow of liquid through check valve 201 past clapper 203. Ball drip outlet cover 211 is shown covering ball drip outlet 204. As shown in FIG. 1, ball drip outlet cover 211 may be removed in order for set rod 102 to access the interior of check valve 201 and to press downwards on clapper 203 in order to open check valve 101.

Figure 3:
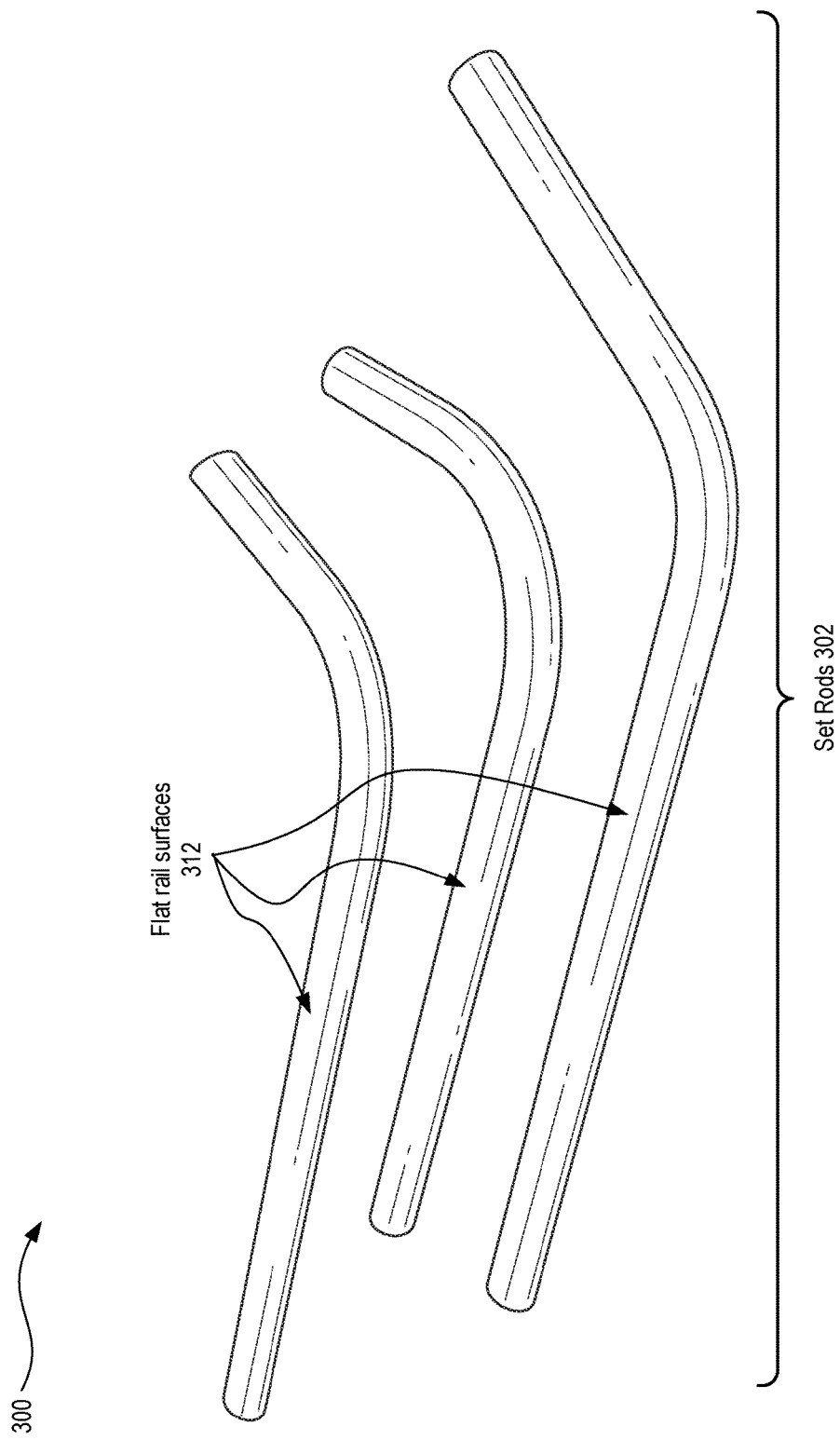
FIG. 3 depicts an exemplary group of set rods having variable size and diameter, in accordance with described embodiments.

FIG. 3 depicts an exemplary group of set rods 300 having variable size and diameter, in accordance with described embodiments.

As shown here, set rod 302 may be of an appropriate length, shape, and diameter to traverse check valve 101 and to press clapper 103 downwards to open check valve 101. According to certain embodiments, set rod 302 may have a flat rail surface 312 suitable for gripping by a tool such as a wrench 410 to hold set rod 302 in a target position where the first end of set rod 302 is placed inside check valve 101 via ball drip outlet 104 and the first end of set rod 302 is pressed downwards against clapper 103, thereby pushing clapper 103 downwards from its horizontal resting position and opening check valve 101. Flat rail surface 312 may extend along all or a portion of sets rods 300. Flat rail surface 312 may be located at least at an exposed surface of set rods 300 when set rods 300 are placed inside check valve 100 and attached to accessories such as first connecting nipple 105, lock mechanism 107, and rod locking component 106. Such an exposed surface of set rods 300 where flat rail surface 312 is located may be, for example, at the second end of set rods 300, distal to lock mechanism 107, i.e. away from check valve 101.

According to certain embodiments, set rods 300 may have pre-drilled holes or openings at any point across them, suitable for attaching locking accessories to secure the set rod in the target position described above. Such attachable locking accessories may include, for example, lock mechanism 107 of rod locking component 106.

According to the described embodiments, the set rods 300 are formed from metal stock having a diameter of ⅝'s inch. However, other metallurgical formations are necessary for certain implementations. For instance, some check valves do not permit the introduction of a ⅝'s inch tool to be inserted. Unfortunately, simply using a lesser diameter metal stock lacks the strength (e.g., ½" steel stock") to withstand the closing force of the clapper. Consequently, the flapper will change position as the moment of plasticity of the set rod's resistance to deformation is exceeded, thus causing the test to fail or causing the test results to be out of compliance. Notably, the force exerted upon the set rod by the clapper as water flows through the check valve in reverse can be significant and will therefore bend a set-rod of insufficient strength. The clapper will exert such strength upon the set rod during the testing of the check valve or during a system back-flush or system forward-flush.

For instance, according to certain embodiments, the set rod is therefore subjected to metallurgical strengthening processes including annealing for the purposes of workability and subsequent quenching for the purpose of metal hardening to increase strength in its final form.

In metallurgy and materials science, annealing is a heat treatment that alters the physical and sometimes chemical properties of a material to increase its ductility and reduce its hardness, making it more workable such that the tool may be formed by working the metal set rod into the appropriate shape, having the appropriate radius at the bend, and forming the flat rail portion. Annealing involves heating a material above its recrystallization temperature, maintaining a suitable temperature for an appropriate amount of time and then cooling. In annealing, atoms migrate in the crystal lattice and the number of dislocations decreases, leading to a change in ductility and hardness. As the material cools, it recrystallizes. For many alloys, including carbon steel, it is the crystal grain size and phase composition, which ultimately determine the material properties, each of which being dependent on the heating rate and cooling rate. Hot working or cold working after the annealing process alters the metal structure, so further heat treatments may be used to achieve the properties required.

Conversely, metallurgical quenching is the rapid cooling of a workpiece in water, oil, or air to obtain certain material properties. Quenching prevents undesired low-temperature processes, such as phase transformations, from occurring by reducing the window of time during which such undesired reactions are most likely to occur. Quenching is most commonly used to harden steel by inducing a martensite transformation, where the steel must be rapidly cooled through its eutectoid point, the temperature at which austenite becomes unstable.

In such embodiments where metallurgical strengthening processes are utilized, the set rod may first be formed from steel stock into a configuration having a bend of a specified radius and a flat rail portion specially configured for a particular model or type of check-valve, after which the previously configured set-rod is then strengthened through a quenching process. In other embodiments, the specially configured set-rod is formed specifically from tool steel to yield a set rod having an adequate strength for the particular application.

Additional metallurgical optimization of the set rod, locking component, nipples, valve, and the other components described herein in relation to the Hydra-Tap system include the use of metals having corrosion resistant properties or additional processing to increase corrosion resistance of such metals. Corrosion is a natural process that converts a refined metal into a more chemically stable oxide. Very often such oxidization is observed as common rust, such as the reddish brown iron oxide typically observed on metals, however, other oxidized states exist and can negatively impact the performance of the metals from which the tools and components are formed. Various types of corrosion resistance may be utilized including corrosion resistant metals such as stainless steel or processing such as galvanizing the tools and metals or coating the metals in a polymer to seal them from environmental oxidizing reactants.

Therefore, in accordance with certain embodiments, one or more components of the Hydra-Tap system, including the set rod, are formed from corrosion resistant materials or coated or processed to provide a corrosion resistant surface.

Figure 4:
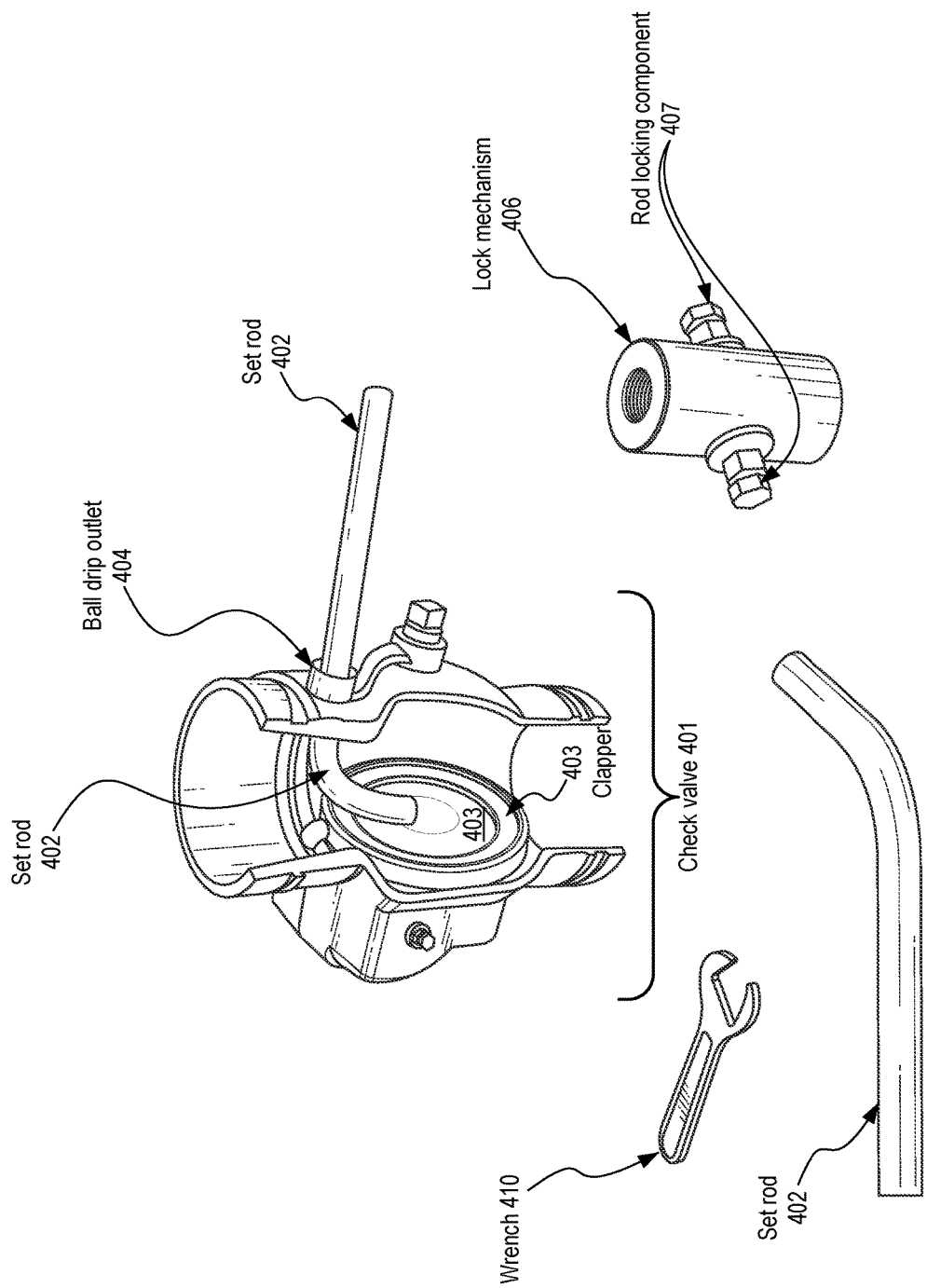
FIG. 4 depicts an exemplary placement of a set rod into a check valve to open the check valve, as well as additional accessories, in accordance with described embodiments.

FIG. 4 depicts an exemplary placement of a set rod into a check valve to open the check valve, as well as additional accessories, in accordance with described embodiments.

As shown here, the first end of set rod 402 is placed through ball drip outlet 404 in a downward position. The first end of set rod 302 is further pressed downwards against clapper 103, thereby pushing clapper 103 downwards from its horizontal resting position and opening check valve 101. To better hold set rod 402 in this position where check valve 101 is open, and attach accessories to set rod 402 for locking set rod 402 in this position, wrench 410 may be used to grip set rod 402 at its second end, for example via a flat rail surface 312 along the second end of set rod 402. After set rod 402 is gripped, for example, by wrench 410, accessories for securing and locking set 402 may be placed and secured around set rod 402 such as first connecting nipple 105, lock mechanism 406, and rod locking component 407 of lock mechanism 406.

Figure 5:
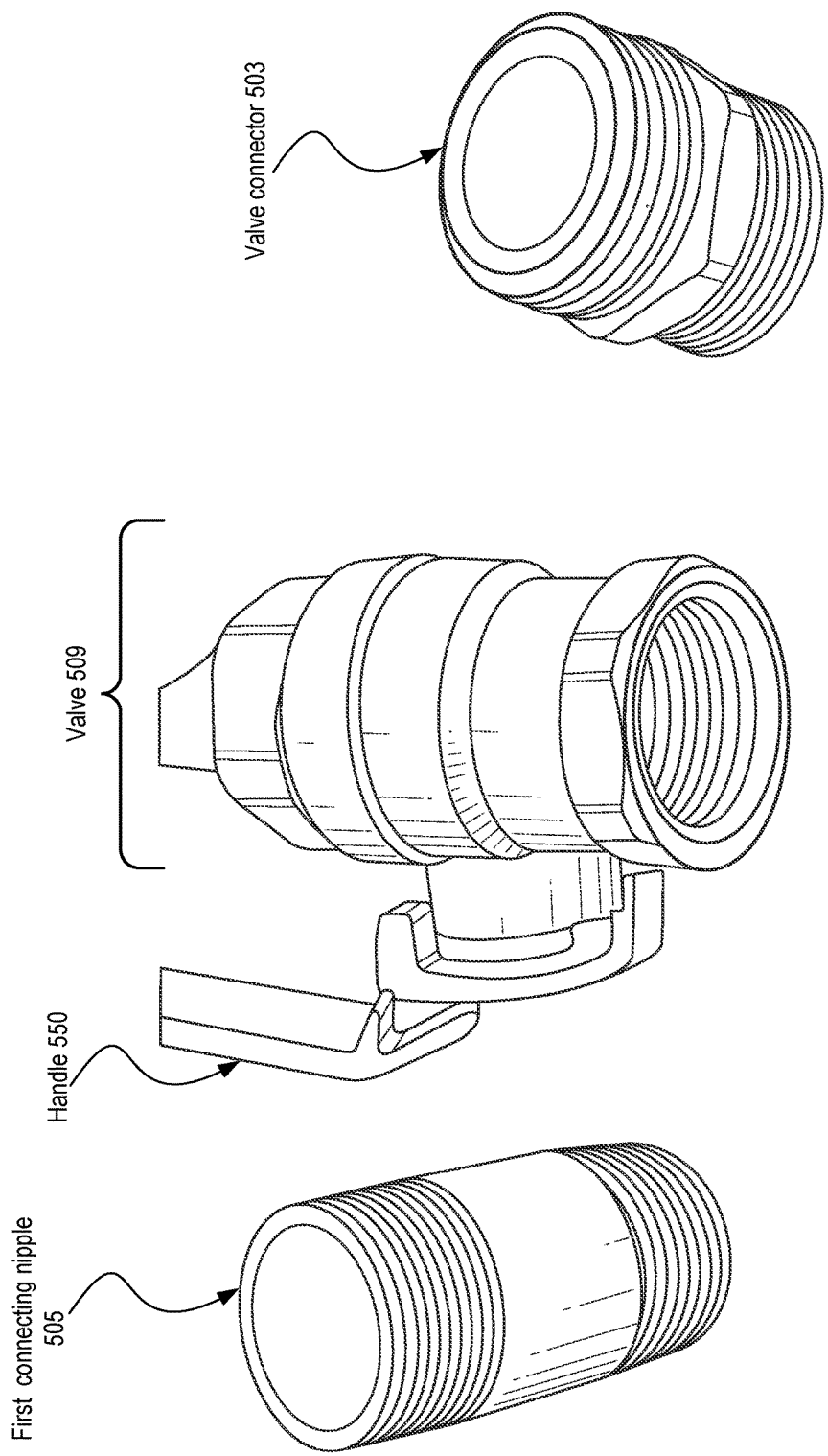
FIG. 5 depicts exemplary accessories to be placed over a set rod in a check valve, in accordance with described embodiments.

FIG. 5 depicts exemplary accessories to be placed over a set rod in a check valve, in accordance with described embodiments.

As shown here, there is a first connecting nipple 505, valve 509, and valve connector 503. The first end of first connecting nipple 505 may be placed around and traverse through set rod 102 to thread into ball drip outlet 104 and the second end of first connecting nipple 505 may receive a threaded first end of rod locking component 106. According to certain embodiments, second and subsequent connecting nipples such as second connecting nipple 108 may also be placed around and traverse through portions of set rod 102. According to yet other embodiments, valve 509 may be added to system 100 as valve 109 to prevent leakage of fluid at the second end of set rod 102, for example by being placed around the end of the second end of set rod 102 where set rod 102 egresses from the second end of rod locking component 106. Valve 509 may have a first end to thread onto and seal against the second end of rod locking component 106 or a second end of second connecting nipple 108. Valve 509 may have a threaded second end to receive connecting components such as a first end of valve connector 503. Valve 509 may also have a handle 550 or other mechanism to control flow moving from the end of the second end of set rod 102 and out through valve 509.

Figure 6A:
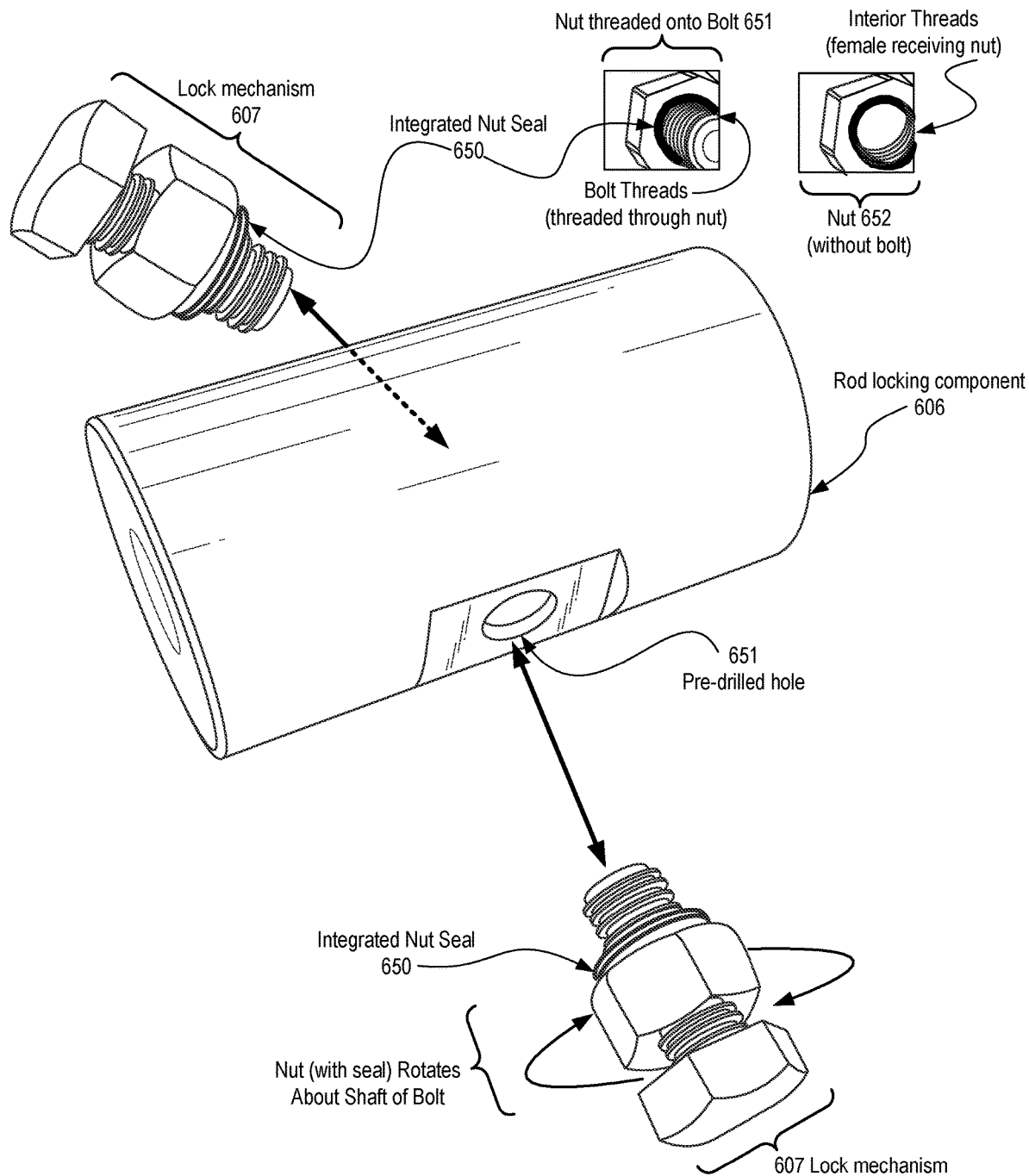
FIG. 6A depicts an exemplary unassembled rod locking component and locking mechanism, in accordance with described embodiments.

FIG. 6A depicts an exemplary unassembled rod locking component and locking mechanism, in accordance with described embodiments.

As shown here, rod locking component 606 may be cylindrical in shape and have one or more pre-drilled holes 651 on a flat surface portion of rod locking component 606 to receive one or more threaded components such as lock mechanism 607 which thread into pre-drilled holes 651 on the flat surface portion of rod locking component 606 and secure set rod 102 in position by inducing a force against rod locking component 606 and set rod 102 when rod locking component 606 is attached to set rod 102.

According to certain embodiments, other mechanisms may be used in place of lock mechanism 607 to attach and secure rod locking component 606 to set rod 102, such as a pin that traverses rod locking component 606 and set rod 102 via pre-drilled holes such as pre-drilled holes 651 on rod locking component 606 as well as pre-drilled holes on set rod 102. According to yet other embodiments, mechanisms for attaching and securing rod locking component 606 to set rod 102 may include an over-center compression force involving a clamp and adjustable lever placed around rod locking component 606.

Further depicted here is an integrated nut seal 650 which permits a specialized use case beyond the previously described use cases which include FDC Back Flushes, and backflow tests, without removal and flipping the check valve into a reverse configuration as is the traditionally accepted practice. In accordance with certain embodiments, there is a further specialized configuration which can withstand hydrostatic pressure so as to permit the system to be utilized for an FDC hydrostatic test. With such a test, it is necessary to have a seal which can withstand a specified threshold PSI of water pressure to successfully complete the FDC hydrostatic test. With such tests, a water-tight testing apparatus is connected to the fire suppression system so as to pressurize the entirety of the system and then validate the ability of the system to withstand the threshold hydrostatic pressure required for the particular jurisdiction. For instance, certain jurisdictions may require a 200 PSI threshold pressure to pass the FDC hydrostatic test. Other jurisdictions require 50 PSI in excess of the average PSI resident pressure for the jurisdiction. A very common standard is 200 PSI for a time period of 2-hours, and thus, a successful test must demonstrate through the testing apparatus that pressure was at or above the threshold pressure for at least the requisite period of time (e.g., 200 PSI for 2-hours or whatever the applicable standard is for the jurisdiction in question).

As is depicted here, the lock mechanism 607 includes a bolt portion and a nut portion. The bolt 651 has threads permitting it to thread into and through the interior threads of a nut 652. As shown at the top-center portion of FIG. 6A, there is a nut threaded onto a bolt 651 in which the bolt threads are exposed on the opposite side of the nut. As shown, the nut includes the integral o-ring which permits a water-tight seal, so long as the nuts are tightened and Teflon tape or some other kind of pipe thread sealant is used on the threads of the pipe nipples. Additionally depicted at the top-right most portion of FIG. 6A is the nut 652 without the bolt in which the interior threads of the nut are exposed and viewable. As before, the nut still includes the integral o-ring which operates as the integrated nut seal 650 and is retained with the nut regardless of whether or not the bolt is present and regardless of whether or not the lock mechanism 607 is installed into the rod locking component.

Still further depicted at the lower right of center portion of FIG. 6A, is the assembled lock mechanism 607 having the bolt presently threaded through the nut with the integrated nut seal 650. As shown here, the thread may thread into the pre-drilled hole 651 within the rod locking component so as to mechanically lock a set rod into place and the nut having the integral seal is further capable to rotate about the shaft of the bolt, regardless of whether the bolt is tightened against the set rod or even threaded into the rod locking component. Stated more simply, each of the bolt and the thread may rotate independently, with the bolt to secure the see rod and with the nut having the integrated nut seal 650 to tighten against the flattened surface of the cylindrical rod locking component so as to form a watertight seal between the rod locking component and the integrated nut seal 650 of the nut.

Prior systems and methods required a specialized tool to be connected with the fire suppression system to perform an FDC hydrostatic test, which takes more time and labor resulting in additional cost and downtime.

Therefore, in accordance with described embodiments, the Hydra-Tap system as described herein may be utilized to perform the hydrostatic testing of the fire suppression system without having to remove the reverse flow check valve 101 and without having to remove the Hydra-Tap system from the reverse flow check valve.

Figure 6B:
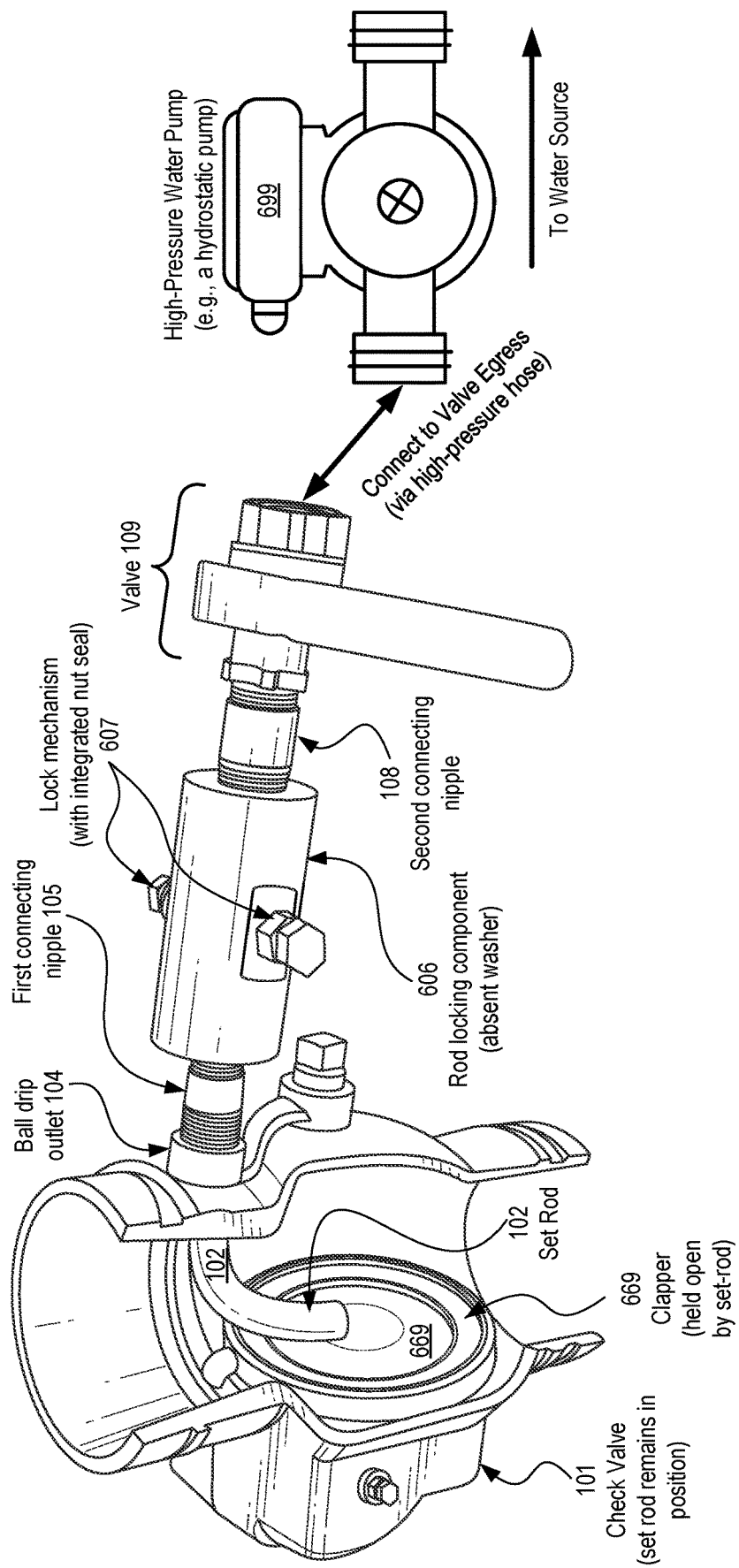
FIG. 6B depicts an exemplary watertight rod locking component in which the set rod remains in place with the Hydra-Tap system creating a watertight connection between the fire suppression system and a water pressure gauge, in accordance with described embodiments.

In a preferred embodiment, which is depicted at FIG. 6B, the hydrostatic test is performed with the Hydra-Tap system connected to the reverse flow check valve, forming a watertight seal, while the set rod remains in-place.

Figure 6C:
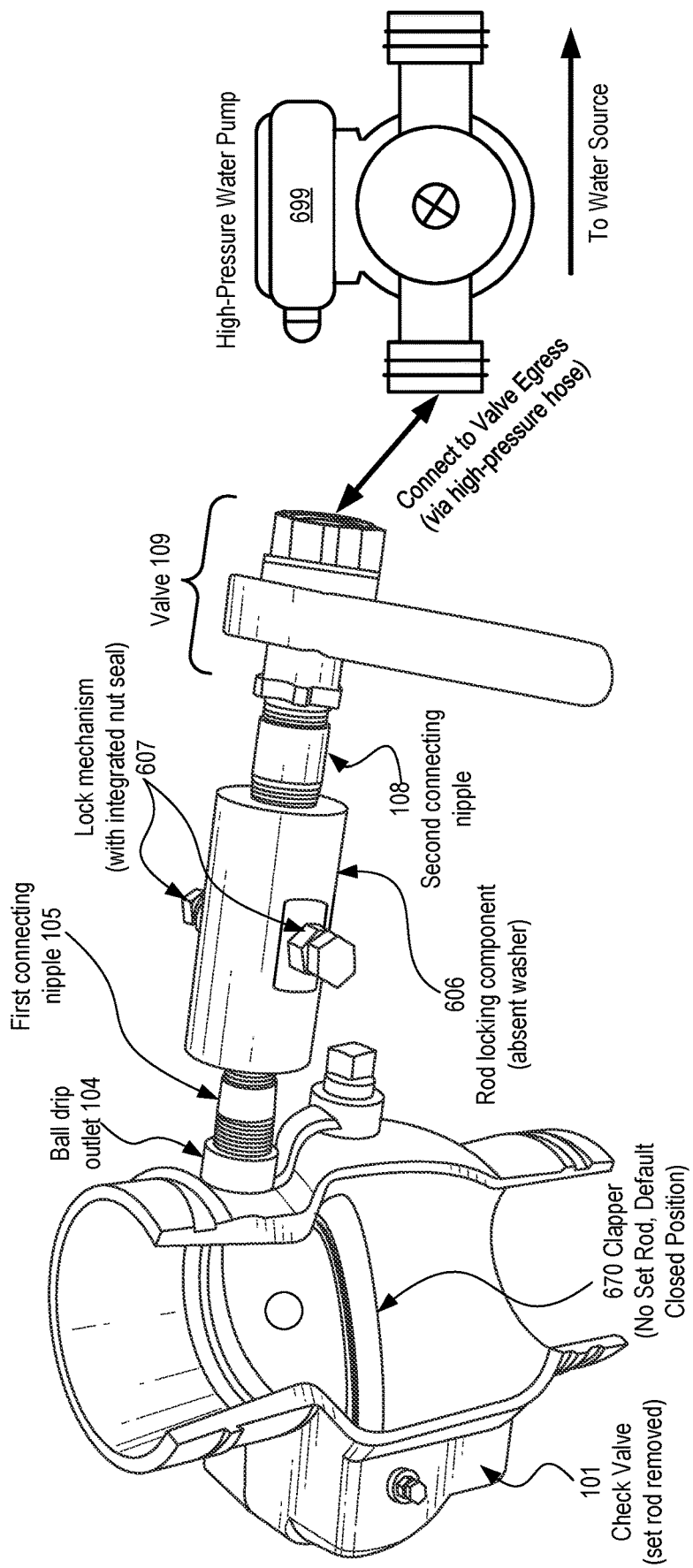
FIG. 6C depicts an alternative watertight rod locking component in which the set rod is optionally removed from the Hydra-Tap system for the performance of the FDC hydrostatic test, in accordance with described embodiments.

In an alternative embodiment depicted at FIG. 6C, the hydrostatic test is performed with the Hydra-Tap system connected to the reverse flow check valve 101, forming a watertight seal, however, the set rod is optionally removed.

Each is described in greater detail below in relation to the following figures.

FIG. 6B depicts an exemplary watertight rod locking component in which the set rod remains in place with the Hydra-Tap system creating a watertight connection between the fire suppression system and a water pressure gauge, in accordance with described embodiments.

Similar to the Hydra-Tap configuration described in relation to FIG. 1, all of the components remain installed on a check valve as depicted here, including the set rod 102 remaining in place, and thus mechanically holding the clapper 669 open by the force of the set rod 102 positioned within the Hydra-Tap system through the rod-locking component 106 and its respective lock mechanism(s) 607.

Notably, however, the difference between the configuration as set forth at FIG. 1 and the Hydra-Tap configuration as depicted here, is that the respective lock mechanism(s) 607 now utilize the integrated nut seal 650 as depicted in greater detail at FIG. 6A, which thus enables the Hydra-Tap system to form a watertight seal against the rod locking component 606.

According to such an embodiment, the specially configured nuts having the integrated nut seal 650 incorporate integral o-rings which replace the combination nut and washer against a separate (e.g., non-integrated) o-ring configuration as depicted at FIG. 1. Stated differently, the o-ring component depicted as the integrated nut seal 650 at FIG. 6A, and which provides the watertight seal, is manufactured as a sub-component of the nut that presses against the surface of the rod-locking component 606.

According to the described embodiments, water penetration is wholly eliminated through the use of the lock mechanism 607 having the integrated nut seal 650 up to 250 PSI within the fire suppression system, thus permitting an FDC hydrostatic pressure test to be conducted while the Hydra-Tap system remains connected with the check valve 101 as is depicted here.

Additionally depicted is the use of a high-pressure water pump 699 which may be connected with the valve 109 via a high pressure hose, thus permitting water from a separate water source to be pumped through the valve 109 of the Hydra-Tap system and into the fire suppression system via the check valve 101 for the purposes of conducting an FDC hydrostatic pressure test. According to certain embodiments, a properly calibrated and certified hydrostatic pump is utilized and connected with the valve 109 of the Hydra-Tap system to induce a properly regulated water pressure into the fire suppression system.

Notably, the high-pressure water pump 699 is capable of pumping water though the Hydra-Tap system at pressures exceeding the jurisdictional minimum (e.g., 200 PSI for many jurisdictions) for the purposes of conducting the FDC hydrostatic pressure test. Depending upon the test requirements and the configuration, the valve 109 may be closed when the fire suppression system is at or above the minimum threshold pressure so as to monitor for not only stable pressure but also the presence of system leaks (e.g., the closed system would lose pressure if a leak is present) or alternatively, the valve 109 may be kept open so as to permit the high pressure water pump 699 to continue to maintain pressure, depending upon the particular testing requirements for the jurisdiction in question.

Note that in this configuration, the set rod 102 is purposefully left in place during the FDC hydrostatic pressure test. As depicted, one or more lock mechanisms 607 affix the set rod 102 into position within the rod locking component and provide a watertight seal. More specifically, the bolt of each lock mechanism 607 threads into a pre-drilled hole of the 651 rod locking component 606 cylinder and tightens against the set rod, however, does not seal the rod locking component. Therefore, separately the nut having the integrated nut seal 650 is tightened against the surface of the rod-locking component to form the necessary watertight seal via the integrated nut seal 650.

As shown, the high pressure water pump 699 pumps water through the valve 109 and then through the second connecting nipple 108, into the lock mechanism having been sealed watertight via the integrated bolt seal 650, through the first connecting nipple 105, and then into the check valve 101 through the ball drop outlet 104, effectively pushing water backwards into the fire suppression system through the Hydra-Tap so as to induce the requisite water pressure for the purposes of conducting the FDC hydrostatic pressure test.

While the presence of the set rod would appear to cause a blockage within the rod locking component and thus inhibit performance of the FDC hydrostatic pressure test, there is in reality sufficient interstitial space between the outside diameter (OD) of the set rod and the inside diameter (ID) of the rod locking component, thus permitting water to flow along and past the set rod through the rod locking component and ultimately into the fire suppression system through the check valve 101. In such a way, water is permitted to fill the fire suppression system and bring the hydrostatic pressure up to the requisite PSI, at which point a reading may be taken from a pre-existing water pressure gauge or via a water pressure gauge attached to the fire suppression system. In alternative embodiments, a water pressure gauge is optionally attached to the Hydra-Tap system as will be described in greater detail below with reference to FIG. 6D.

FIG. 6C depicts an alternative watertight rod locking component in which the set rod is optionally removed from the Hydra-Tap system for the performance of the FDC hydrostatic test. Notwithstanding the removal of the set rod, the Hydra-Tap system still creates a watertight connection between the fire suppression system and a water pressure gauge, in accordance with described embodiments through the use of the integrated nut seal 650 of the lock mechanism 607.

As shown here, certain embodiments utilize the integrated nut seal 650 at the locking mechanism 602 which seats in between the rod locking component 606 and the lock mechanism 607 to produce a water-tight seal capable of withstanding more than the threshold PSI required for the FDC hydrostatic test. For instance, the integrated nut seal 650 shown here and presently utilized with compatible implementations is rated for 1500 PSI.

Through the use of the integrated nut seal 650, an entirely watertight connection is formed from the check valve, through the ball drip outlet (see element 104) to which the first connecting nipple (see element 105) is inserted, and then into the lock mechanism (see element 107). Normally, the set rod (see element 102) will be in-position and holding the clapper (see element 103) in an open position for the sake of an FDC backflow or forward flow test or for the sake of a system reverse flush as described above and as depicted at FIG. 6B. However, with the use of the integrated nut seal 650 tightened onto the outside face of the rod-locking component (see element 106) and held under pressure by the lock mechanisms (see element 107), a watertight seal can optionally be made at the rod locking component 606 via the lock mechanism 607 by threading the bolt into the pre-drilled hole 651 of the rod locking component which will remain loose as the bolt does not tighten against the missing set rod. Nonetheless, the depicted nut having the integrated nut seal 650 as shown at FIG. 6A is capable of threading and tightening against the surface of the rod locking component 606 as there will be an opposing force by the bolt held into position by the threads of the pre-drilled hole 651, thus permitting an opposing clamping force to squeeze the integral o-ring of the nut against the mating surface to form the watertight seal.

The choice to remove the set rod 102 or to retain the set rod in place is up to the individual conducting the test or may be done so as to ensure compliance with jurisdictional requirements or at the request of a compliance inspector. The Hydra-Tap system permits both options when conducting FDC hydrostatic pressure tests.

In such a way, a watertight seal is thus made to extend beyond the open orifices of the pre-drilled hole 651 of the rod locking component 606. As shown here, at the opposite end of the rod locking component 606, there is a second connecting nipple (see element 108) which forms a watertight connection into the valve (see element 109) which may then either be closed fully to form a watertight connection or may be opened to permit water to exert hydrostatic pressure onto a pressure gauge located elsewhere within the fire pressure system or to exert pressure against another hydrostatic pressure testing apparatus connected with the fire suppression system.

As with the FDC backflush and forward-flow tests, the Hydra-Tap system both provides a watertight seal at the opposite and egress end of the valve (see element 109) as well as permits a water pressure reading so as to permit the operator to perform the FDC hydrostatic test without having to remove or reconfigure the check valve and further with or without requiring the removal of the set rod, as described herein.

In either configuration (e.g., with or without the set rod in position), the first and second connecting nipples, the valve, the rod locking component and the lock mechanism (either one or multiple) would remain in place and threaded into or otherwise connected with the ball drip outlet, thus permitting a hydrostatic water pressure gauge to be connected with the fire suppression system.

Figure 6D:
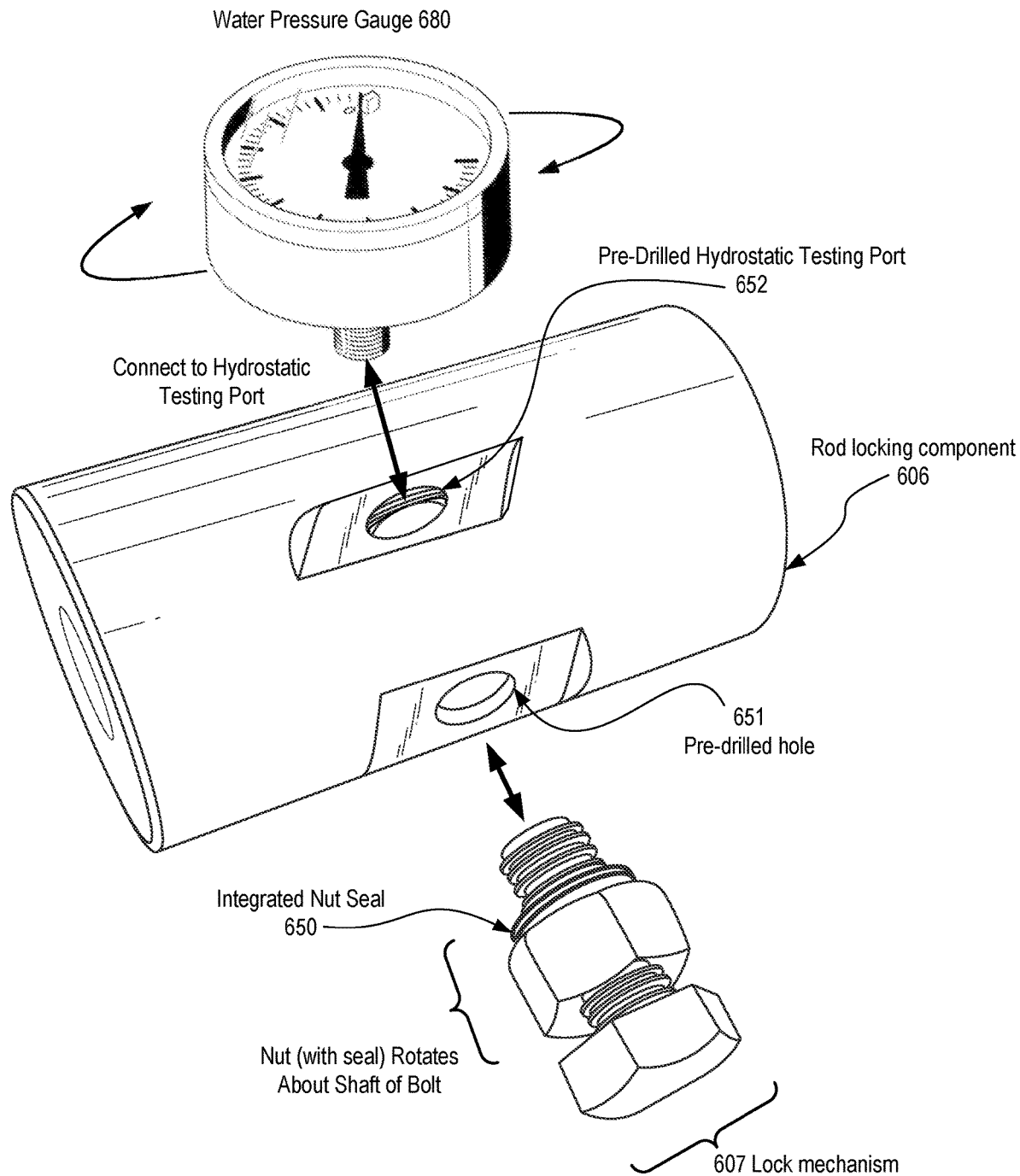
FIG. 6D depicts an alternative exemplary assembled rod locking component and locking mechanism having a port for a hydrostatic water pressure gauge, in accordance with described embodiments.

FIG. 6D depicts an alternative exemplary assembled rod locking component and locking mechanism having a port for a hydrostatic water pressure gauge 680, in accordance with described embodiments.

As depicted here, there is further provided a pre-drilled hydrostatic testing port 652 which permits a tradesman to optionally thread and connect a water pressure gauge 680 to the rod locking component 606 for the performance of the FDC hydrostatic pressure test.

The water pressure gauge 680 may be provided as an optional testing component manufactured by or provided and sold with the Hydra-Tap system according to such embodiments. The water pressure gauge 680 may be retained within the rod locking component 606 during FDC backflush and forward-flow tests and then utilized for the purpose of reading the current PSI in the fire suppression system during an FDC hydrostatic pressure test. Alternatively, so as to protect the water pressure gauge 680, the gauge may be removed and stored separately, and then another lock mechanism 607 having an integrated nut seal may be threaded into the pre-drilled hydrostatic testing port 652 so as to provide a water-tight seal at the testing port 652 when the water pressure gauge 680 is not actively in use.

Compliant use of the pre-drilled hydrostatic testing port 652 and the water pressure gauge 680 may be depending upon the particular jurisdictional requirements within which the fire suppression system in question is being tested or based upon the requirements of a particular compliance inspector. Nonetheless, the Hydra-Tap system permits the option to use the water pressure gauge 680 to conduct readings locally at the Hydra-Tap system when permitted by applicable regulation.

Figure 6E:
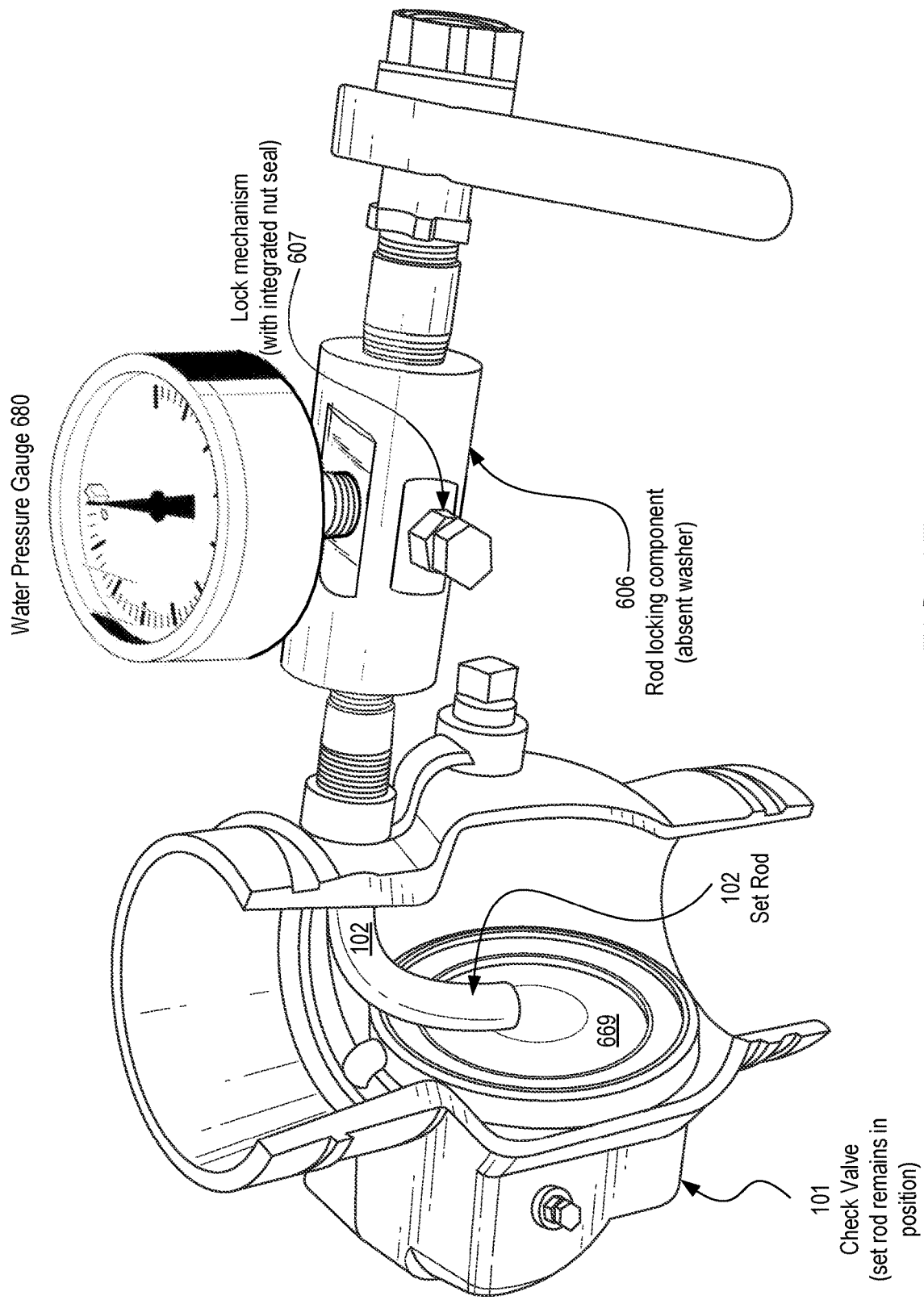
FIG. 6E depicts another alternative view of the Hydra-Tap system having the water pressure gauge affixed to the rod locking component via the pre-drilled port for hydrostatic testing, in accordance with described embodiments.

FIG. 6E depicts another alternative view of the Hydra-Tap system having the water pressure gauge 680 affixed to the rod locking component 606 via the pre-drilled port for hydrostatic testing 652, in accordance with described embodiments.

More specifically, depicted here is the water pressure gauge 680 affixed with the Hydra-Tap system and providing a watertight seal such that the FDC hydrostatic pressure test may be performed as described above while reading the current pressure locally at the Hydra-Tap system.

Figure 7:
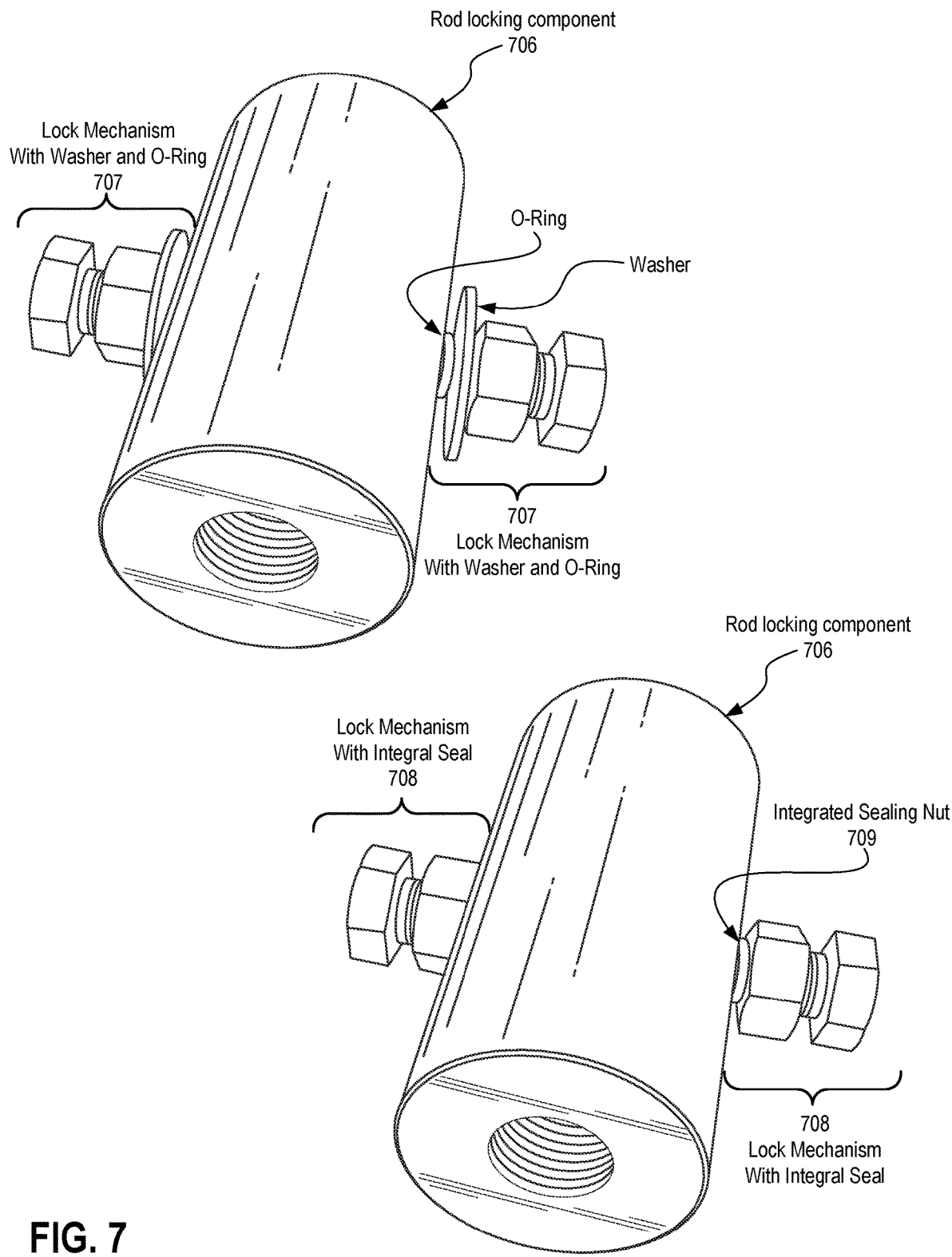
FIG. 7 depicts an exemplary assembled rod locking component and locking mechanism, in accordance with described embodiments.

FIG. 7 depicts an exemplary assembled rod locking component and locking mechanism, in accordance with described embodiments.

As shown here, rod locking component 706 may be cylindrical in shape. Rod locking component 706 may have one or more pre-drilled holes 651 on a flat surface portion of rod locking component 706 via which one or more threaded components such as lock mechanism 707 have been threaded into pre-drilled holes 651 on the flat surface portion of rod locking component 706. Lock mechanism 707 secures rod locking component 706 and components that may traverse through rod locking component 706 such as set rod 102 in position by inducing a force against rod locking component 706.

Notably, there is depicted here both configurations for sealing water from leaking from the Hydra-Tap system. Specifically, there is depicted at the top left, the rod locking component 706 having the lock mechanism with a washer and an O-ring 707 and then depicted at the bottom right is the alternatively configured rod locking component 707 having the lock mechanism which utilizes the integrated sealing nut 709.

FIG. 8 depicts a flowchart a flowchart for an exemplary method 800 for securing a check valve in an open state, in accordance with described embodiments.

At block 805 of FIG. 8, method 800 is performing for securing a check valve in an open state via the following operations:

At block 810, removing a ball drip outlet cover on the check valve to expose a ball drip outlet.

At block 815, placing a first end of a set rod against a clapper inside the check valve, wherein the set rod traverses its first end and a curved portion through the ball drip outlet, wherein the set rod pushes the clapper downwards to open the set rod.

At block 820, threading a first end of a first connecting nipple through the set rod and into the ball drip outlet of the check valve.

Method 800 continues at FIG. 8.

At block 825 of FIG. 8, receiving a rod locking component at a second end of the set rod, wherein the rod locking component traverses through the second end of the set rod to attach a first end of the rod locking component with a second end of the first connecting nipple, wherein the lock mechanism of the rod locking component is in a center position of the rod locking component.

At block 830, fixing the set rod in position against the clapper inside the check valve via: grasping the set rod via a flat rail surface located at the second end of the set rod distal to the rod locking component, and securing the lock mechanism of the rod locking component.

According to another embodiment of method 800, placing the first end of the set rod against a clapper inside the check valve includes: measuring a distance to insert the set rod into the check valve via holding the set rod in front of the check valve with the first end of the set rod pointed in a downward position corresponding to a target point of a first end of the first end of the set rod inside the check valve that is below the clapper; demarcating a line on the set rod corresponding to an intersection point between the set rod and a perpendicular plane traversing the set rod and ball drip outlet; and inserting the set rod through the ball drip outlet until the demarcated line on the set rod interfaces with the ball drip outlet, wherein the first end of the set rod is pointed downwards.

According to another embodiment of method 800, there is a system including: a set rod having a first end and a second end, and a curved portion, in which the first end of the set rod is to be placed against a clapper inside the check valve; a first connecting nipple having a first end to thread into a ball drip outlet of the check valve and a second end to receive a rod locking component; the rod locking component having at least: (i) a first end to attach with the second end of the first connecting nipple, (ii) a second end, and (iii) a lock mechanism positioned in a center portion of the rod locking component to positionally fix the set rod in its position while placed against the clapper inside of the check valve; in which the first end of the set rod is to be positioned against the clapper inside the check valve, in which the set rod is fixed in its position by the lock mechanism of the rod locking component, and in which the set rod traverses through the ball drip outlet of the check valve into the first connecting nipple, through the first connecting nipple into the rod locking component, and egresses through the second end of the rod locking component.

According to another embodiment of method 800, there is a second connecting nipple having a first end to attach with the rod locking component and a second end positioned away from the rod locking component.

According to another embodiment of method 800, the rod locking component comprises: a cylinder having a threaded first end to thread onto and seal against the first connecting nipple.

According to another embodiment of method 800, the first connecting nipple and rod locking component are part of a continuous piece.

According to another embodiment of method 800, adapters are connected to a first end of the continuous piece to attach the continuous piece to the ball drip outlet.

According to another embodiment of method 800, one or more of the: (i) set rod, (ii) first connecting nipple, and (iii) rod locking component are variable in diameter, shape, and length to accommodate variations in the size, shape, and position of one or more of the: (i) ball drip outlet, (ii) clapper, and (iii) check valve.

According to another embodiment of method 800, the lock mechanism comprises one or more of: (i) threading mechanical pieces into the rod locking component to induce a force against the set rod; (ii) accepting a pin that traverses the rod locking component and set rod via pre-drilled holes in the rod locking component and set rod; and (iii) an over-center compression force including a clamp and adjustable lever.

None of the claims are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for securing a check valve in an open state, the method comprising:
   removing a ball drip outlet cover on the check valve to expose a ball drip outlet;
   placing a first end of a set rod against a clapper inside the check valve, wherein the set rod traverses its first end and a curved portion through the ball drip outlet, wherein the set rod pushes the clapper downwards to open the check valve;

threading a first end of a first connecting nipple through the set rod and into the ball drip outlet of the check valve;

receiving a rod locking component having a lock mechanism at a second end of the set rod, wherein the rod locking component traverses through the second end of the set rod to attach a first end of the rod locking component with a second end of the first connecting nipple, wherein the lock mechanism of the rod locking component is in a center portion of the rod locking component; and fixing the set rod in position against the clapper inside the check valve via:
grasping the set rod via a flat rail surface located at the second end of the set rod distal to the rod locking component, and
securing the lock mechanism of the rod locking component.

2. The method of claim 1, wherein placing the first end of the set rod against a clapper inside the check valve includes:
measuring a distance to insert the set rod into the check valve via holding the set rod in front of the check valve with the first end of the set rod pointed in a downward position corresponding to a target point of a first end of the first end of the set rod inside the check valve that is below the clapper;
demarcating a line on the set rod corresponding to an intersection point between the set rod and a perpendicular plane traversing the set rod and ball drip outlet; and
inserting the set rod through the ball drip outlet until the demarcated line on the set rod interfaces with the ball drip outlet, wherein the first end of the set rod is pointed downwards.

3. The method of claim 1, wherein a second connecting nipple having a first end attaches with the rod locking component and a second end positioned away from the rod locking component.

4. The method of claim 1, wherein the rod locking component comprises: a cylinder having a threaded first end to thread onto and seal against the first connecting nipple.

5. The method of claim 1:
wherein the first connecting nipple and rod locking component are part of a continuous piece; and
wherein adapters are connected to a first end of the continuous piece to attach the continuous piece to the ball drip outlet.

6. The method of claim 1, wherein one or more of the: (i) set rod, (ii) first connecting nipple, and (iii) rod locking component are variable in diameter, shape, and length to accommodate variations in the size, shape, and position of one or more of the: (i) ball drip outlet, (ii) clapper, and (iii) check valve.

7. The method of claim 1, wherein the lock mechanism comprises one or more of: (i) threading mechanical pieces into the rod locking component to induce a force against the set rod; (ii) accepting a pin that traverses the rod locking component and set rod via pre-drilled holes in the rod locking component and set rod; and (iii) an over-center compression force including a clamp and adjustable lever.

8. The method of claim 1:
wherein the set rod is removable from the rod locking component when the lock mechanism is loosened;
wherein the lock mechanism further comprises an integrated nut seal;
wherein the lock mechanism fully threads against an exterior face of the rod locking component to form a watertight seal between the rod locking component and the lock mechanism via the integrated nut seal; and
wherein the system further comprises a water pressure gauge to be connected with an opposite end of the valve.

9. The method of claim 8, wherein the water pressure gauge connected maintains a leak proof hydrostatic pressure in excess of a jurisdictional specified threshold pressure.

10. The method of claim 9, wherein the jurisdictional specified threshold pressure requires the water pressure gauge to indicate greater than 200 PSI for more than 2-hours to successfully pass an FDC hydrostatic test.

11. A system for securing a check valve in an open state, the system comprising:
a set rod having a first end and a second end, and a curved portion, wherein the first end of the set rod is to be placed against a clapper inside the check valve;
a first connecting nipple having a first end to thread into a ball drip outlet of the check valve and a second end to receive a rod locking component;
the rod locking component having at least: (i) a first end to attach with the second end of the first connecting nipple, (ii) a second end, and (iii) a lock mechanism positioned in a center portion of the rod locking component to positionally fix the set rod in its position while placed against the clapper inside of the check valve;
wherein the first end of the set rod is to be positioned against the clapper inside the check valve;
wherein the set rod is fixed in its position by the lock mechanism of the rod locking component; and
wherein the set rod traverses through the ball drip outlet of the check valve into the first connecting nipple, through the first connecting nipple into the rod locking component, and egresses through the second end of the rod locking component.

12. The system of claim 11 further comprising a second connecting nipple having a first end to attach with the rod locking component and a second end positioned away from the rod locking component.

13. The system of claim 11, wherein the rod locking component comprises: a cylinder having a threaded first end to thread onto and seal against the first connecting nipple.

14. The system of claim 11, wherein the first connecting nipple and rod locking component are part of a continuous piece.

15. The system of claim 14, wherein adapters are connected to a first end of the continuous piece to attach the continuous piece to the ball drip outlet.

16. The system of claim 11, wherein one or more of the: (i) set rod, (ii) first connecting nipple, and (iii) rod locking component are variable in diameter, shape, and length to accommodate variations in the size, shape, and position of one or more of the: (i) ball drip outlet, (ii) clapper, and (iii) check valve.

17. The system of claim 11, wherein the lock mechanism comprises one or more of: (i) threading mechanical pieces into the rod locking component to induce a force against the set rod;
(ii) accepting a pin that traverses the rod locking component and set rod via pre-drilled holes in the rod locking component and set rod; and (iii) an over-center compression force including a clamp and adjustable lever.

18. The system of claim 11,
wherein the set rod is removable from the rod locking component when the lock mechanism is loosened;
wherein the lock mechanism further comprises an integrated nut seal;
wherein the lock mechanism fully threads against an exterior face of the rod locking component to form a watertight seal between the rod locking component and the lock mechanism via the integrated nut seal; and
wherein the system further comprises a water pressure gauge to be connected with an opposite end of the valve.

19. The system of claim 18, wherein the system with the water pressure gauge connected maintains a leak proof hydrostatic pressure in excess of a jurisdictional specified threshold pressure.

20. The system of claim 19, wherein the jurisdictional specified threshold pressure requires the water pressure gauge to indicate greater than 200 PSI for more than 2-hours to successfully pass an FDC hydrostatic test.

\* \* \* \* \*